United States Patent
Lindahl et al.

(10) Patent No.: US 9,300,969 B2
(45) Date of Patent: Mar. 29, 2016

(54) VIDEO STORAGE

(75) Inventors: Aram Lindahl, Menlo Park, CA (US); Wei Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1219 days.

(21) Appl. No.: 12/556,363

(22) Filed: Sep. 9, 2009

(65) Prior Publication Data

US 2011/0058055 A1    Mar. 10, 2011

(51) Int. Cl.

| H04N 7/12 | (2006.01) |
|---|---|
| H04N 19/124 | (2014.01) |
| H04N 19/137 | (2014.01) |
| H04N 19/149 | (2014.01) |
| H04N 19/61 | (2014.01) |
| H04N 19/51 | (2014.01) |

(52) U.S. Cl.
CPC ........... *H04N 19/137* (2014.11); *H04N 19/124* (2014.11); *H04N 19/149* (2014.11); *H04N 19/61* (2014.11)

(58) Field of Classification Search
USPC .................................................. 375/240.03
See application file for complete search history.

(56) References Cited

U.S. PATENT DOCUMENTS

| 6,501,798 | B1 | 12/2002 | Sivan |
|---|---|---|---|
| 6,606,388 | B1 | 8/2003 | Lindahl |
| 6,717,576 | B1 | 4/2004 | Duluk, Jr. |
| 6,782,135 | B1 | 8/2004 | Viscito et al. |
| 7,167,181 | B2 | 1/2007 | Duluk, Jr. |
| 7,456,760 | B2 | 11/2008 | Normile et al. |
| 7,536,565 | B2 | 5/2009 | Girish et al. |
| 7,559,026 | B2 | 7/2009 | Girish et al. |
| 2002/0009143 | A1* | 1/2002 | Arye ................ H04N 21/23424 375/240.16 |
| 2005/0201572 | A1 | 9/2005 | Lindahl |
| 2006/0067535 | A1 | 3/2006 | Culbert |
| 2006/0067536 | A1 | 3/2006 | Culbert |
| 2006/0221788 | A1 | 10/2006 | Lindahl |
| 2006/0233237 | A1 | 10/2006 | Lu |
| 2006/0269265 | A1* | 11/2006 | Wright et al. .................. 396/60 |
| 2006/0274905 | A1 | 12/2006 | Lindahl |
| 2007/0083467 | A1 | 4/2007 | Lindahl |
| 2007/0097221 | A1* | 5/2007 | Stavely et al. ........... 348/208.11 |
| 2007/0111750 | A1* | 5/2007 | Stohr et al. ................. 455/550.1 |
| 2007/0116117 | A1 | 5/2007 | Tong |
| 2007/0116124 | A1 | 5/2007 | Wu |
| 2007/0116126 | A1 | 5/2007 | Haskell |
| 2007/0116437 | A1 | 5/2007 | Pun |

(Continued)

OTHER PUBLICATIONS

Dirk Farin, Introduction to Video Compression H.261, Power Point Presentation, pp. 1-12, available at http://www.informatik.uni-mannheim.de/pi4.data/content/courses/2003-ss/multimedia/h261teil1.pdf.

*Primary Examiner* — Andy Rao
*Assistant Examiner* — Obafemi Sosanya
(74) *Attorney, Agent, or Firm* — Kenyon & Kenyon LLP

(57) ABSTRACT

Systems, methods, and devices for encoding video data are provided. For example, an electronic device for obtaining and encoding video may include image capture circuitry, motion-sensing circuitry, and data processing circuitry. The image capture circuitry may capture an uncompressed video frame, and the motion-sensing circuitry may detect physical motion of the electronic device. The data processing circuitry may encode the uncompressed video frame based at least in part on a quantization parameter, which the data processing circuitry may determine based at least in part on whether the motion-sensing circuitry has detected physical motion of the electronic device.

37 Claims, 6 Drawing Sheets

(56) References Cited

U.S. PATENT DOCUMENTS

| | | |
|---|---|---|
| 2007/0157268 A1 | 7/2007 | Girish |
| 2007/0165035 A1 | 7/2007 | Duluk, Jr. |
| 2007/0217503 A1 | 9/2007 | Haskell |
| 2007/0230747 A1* | 10/2007 | Dunko ................. G06F 1/1626 382/107 |
| 2007/0286282 A1 | 12/2007 | Haskell |
| 2008/0063054 A1 | 3/2008 | Ratakonda |
| 2008/0063085 A1 | 3/2008 | Wu |
| 2008/0075296 A1 | 3/2008 | Lindahl |
| 2008/0095238 A1 | 4/2008 | Wu |
| 2008/0107180 A1 | 5/2008 | Lee et al. |
| 2008/0118224 A1 | 5/2008 | Toma et al. |
| 2008/0130989 A1 | 6/2008 | Moriya et al. |
| 2008/0181298 A1 | 7/2008 | Shi |
| 2008/0253461 A1 | 10/2008 | Lin |
| 2008/0253463 A1 | 10/2008 | Lin |
| 2008/0307477 A1 | 12/2008 | Omernick |
| 2009/0003115 A1 | 1/2009 | Lindahl |
| 2009/0005891 A1 | 1/2009 | Batson |
| 2009/0006488 A1 | 1/2009 | Lindahl |
| 2009/0006671 A1 | 1/2009 | Batson |
| 2009/0022224 A1 | 1/2009 | Haskell |
| 2009/0022225 A1 | 1/2009 | Haskell |
| 2009/0060472 A1 | 3/2009 | Bull |
| 2009/0073005 A1 | 3/2009 | Normile |
| 2009/0083047 A1 | 3/2009 | Lindahl |
| 2009/0103610 A1 | 4/2009 | Puri |
| 2009/0128639 A1* | 5/2009 | Ozluturk ........... H04N 5/23248 348/208.5 |
| 2009/0167508 A1 | 7/2009 | Fadell |
| 2009/0167509 A1 | 7/2009 | Fadell |
| 2009/0168898 A1 | 7/2009 | Wallace |
| 2009/0169124 A1 | 7/2009 | Wallace |
| 2009/0172542 A1 | 7/2009 | Girish |
| 2009/0180533 A1 | 7/2009 | Bushell |
| 2009/0180545 A1 | 7/2009 | Wu |
| 2009/0182445 A1 | 7/2009 | Girish |
| 2009/0290645 A1* | 11/2009 | Mabey ............... H04N 5/23203 375/240.25 |
| 2009/0303204 A1* | 12/2009 | Nasiri et al. .................. 345/184 |
| 2010/0240402 A1* | 9/2010 | Wickman et al. ............. 455/466 |
| 2011/0054833 A1* | 3/2011 | Mucignat ...................... 702/150 |

\* cited by examiner

VIDEO STORAGE

BACKGROUND

The presently disclosed subject matter relates generally to video coding techniques and, more particularly, to video coding techniques involving the selection of a quantization parameter (QP) and/or a data rate based on motion-sensing circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many video coding techniques, such as those outlined by standards such as MPEG-1, 2, and 4 and H.261, H.263, and H.264, achieve compression of video signals by removing redundant information. This information may include, for example, redundant temporal and/or spatial information in a series of video images. In addition, such video coding techniques may remove information that may otherwise by imperceptible to a user watching the decoded video. For example, one video coding technique may involve encoding a first video frame as a "key frame," which may preserve substantially all information about the original video frame, and which may take up a significant amount of storage space. A series of subsequent frames may be encoded as "non-key frames," which may include substantially only differences between the subsequent non-key frames and the key frame, and which may take up significantly less storage space.

During the encoding process, to relate the subsequent non-key frames to the key frame and previous non-key frames in decoding order, the subsequent frames may be predicted by the encoder based on information in the video frames. However, the predicted frames are unlikely to perfectly predict the actual video frame to be encoded. A difference between the original, uncompressed video frame to be encoded and the predicted frame may be referred to as prediction error. This prediction error may carry additional spatial details about the predicted frame. By applying a spatial transform to the prediction error, a corresponding decoder may obtain coefficients carrying spatial detail not present in the predicted frame.

Based on a desired video compression bit rate and a desired quality for a given frame, the encoder may apply a quantization parameter (QP) during the encoding process to the prediction error. The QP may represent one of a finite number of step sizes for use in transforming the prediction error. With a larger value of QP, the transformation may result in a video signal having a smaller number of bits. However, the video signal may produce a distorted image if the source video frame is particularly complex. On the other hand, smaller values of QP may produce more precisely reconstructed images, but may require a greater number of bits. Selecting a proper QP for encoding a current video frame may involve examining a series of future or prior video frames to predict motion in the frame. However, a system that lacks the capability to look ahead due to hardware limitations or practical considerations may be unable to select the proper QP in such a manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate generally to systems, methods, and devices for encoding video with varying quantization based on detected image capture circuitry motion from motion-sensing circuitry. For example, an electronic device for obtaining and encoding video may include image capture circuitry, motion-sensing circuitry, and data processing circuitry. The image capture circuitry may capture an uncompressed video frame, and the motion-sensing circuitry may detect physical motion of the electronic device. The data processing circuitry may encode the uncompressed video frame based at least in part on a quantization parameter, which the data processing circuitry may determine based at least in part on whether the motion-sensing circuitry has detected physical motion of the electronic device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the presently disclosed subject matter may relate generally to systems, methods, and devices for performing video coding techniques. In particular, the present embodiments may relate to techniques for selecting a quantization parameter (QP) for encoding frames of video data. Since the selected QP may affect the bit rate and quality of encoded video frames, the QP may be selected as relatively lower when the frame to be encoded is accompanied with motion, so as to properly capture sufficient frame details. Similarly, the QP may be selected as relatively higher when the frame to be encoded is not accompanied with motion, as a lower QP may be unnecessary to preserve frame details during periods of non-motion, given the same complexity of target object(s) in both cases.

Rather than looking ahead to large numbers of future or prior video frames to estimate frame motion, the presently disclosed embodiments may involve estimating frame motion based on image capture circuitry motion detected by motion-sensing circuitry. Additionally, the detected motion may or may not be taken into account depending on whether the motion of the image capture circuitry, as determined by the motion-sensing circuitry, tracks the motion of captured video images. For example, the image capture circuitry motion may be considered when a stationary subject is captured by moving image capture circuitry, but not when moving image capture circuitry tracks the motion of a moving subject.

Figure 1:
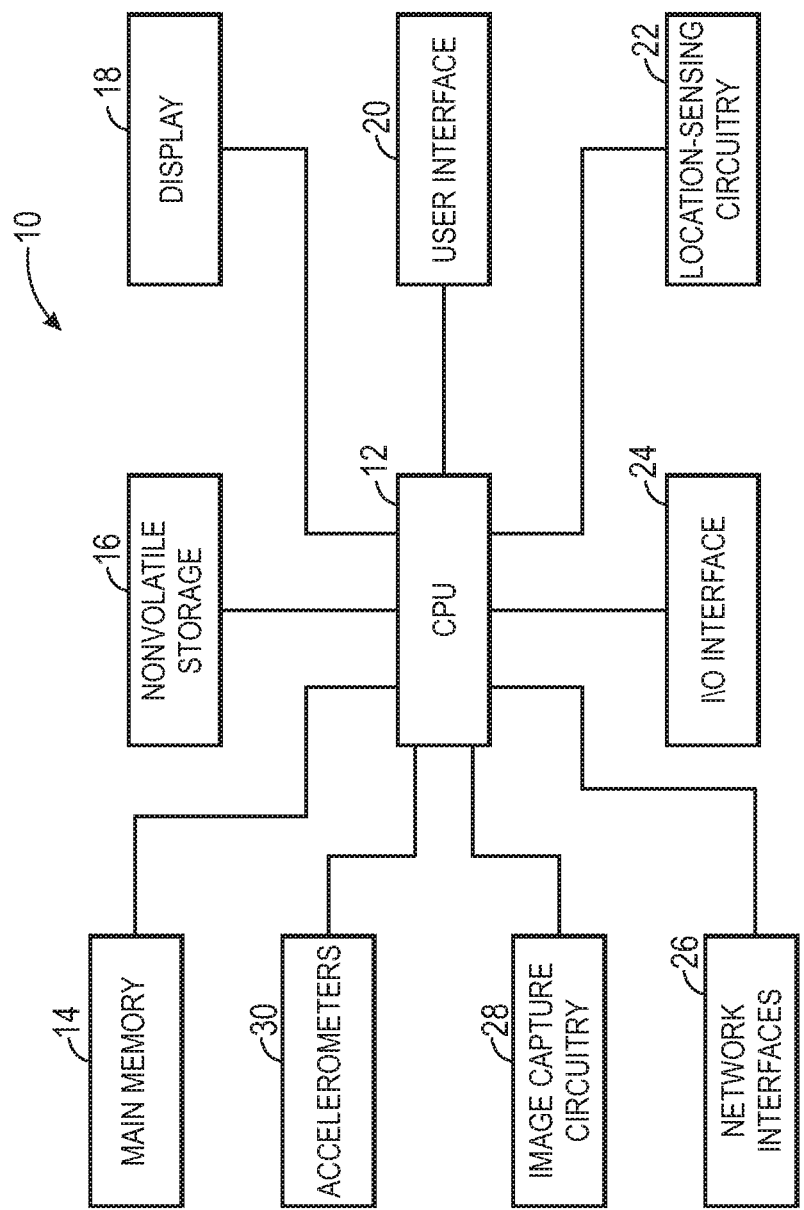
FIG. 1 is a block diagram of an electronic device capable of performing video coding, in accordance with an embodiment.
Figure 2:
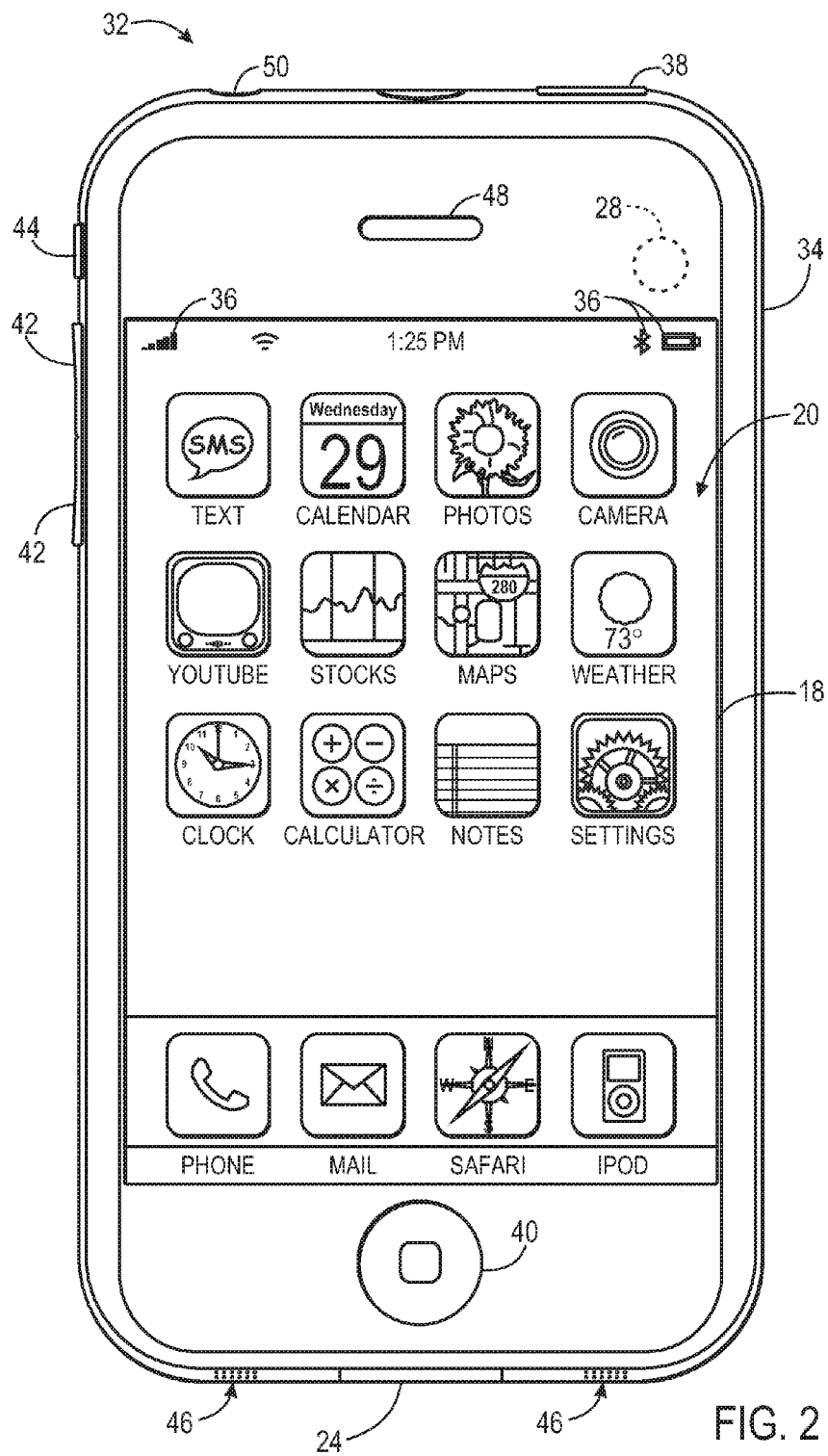
FIG. 2 is a schematic representation of the electronic device of FIG. 1, in accordance with an embodiment.

A general description of suitable electronic devices for performing the presently disclosed techniques is provided below. In particular, FIG. 1 is a block diagram depicting various components that may be present in an electronic device suitable for use with the present techniques. Similarly, FIG. 2 represents one example of a suitable electronic device, which may be, as illustrated, a handheld electronic device having image capture circuitry, motion-sensing circuitry, and video processing capabilities.

Turning first to FIG. 1, electronic device 10 for performing the presently disclosed techniques may include, among other things, central processing unit (CPU) 12, main memory 14, nonvolatile storage 16, display 18, user interface 20, location-sensing circuitry 22, input/output (I/O) interface 24, network interfaces 26, image capture circuitry 28, and accelerometers 30. By way of example, electronic device 10 may represent a block diagram of the handheld device depicted in FIG. 2 or similar devices. Additionally or alternatively, electronic device 10 may represent a system of electronic devices with certain characteristics. For example, a first electronic device may include at least image capture circuitry 28 and motion-sensing circuitry such as accelerometers and/or location-sensing circuitry 22, and a second electronic device may include CPU 12 and other data processing circuitry.

In electronic device 10 of FIG. 1, CPU 12 may be operably coupled with main memory 14 and nonvolatile memory 16 to perform various algorithms for carrying out the presently disclosed techniques. Display 18 may be a touch-screen display, which may enable users to interact with user interface 20 of electronic device 10. Location-sensing circuitry 22 may represent device capabilities for determining the relative or absolute location of electronic device 10. By way of example, location-sensing circuitry 22 may represent Global Positioning System (GPS) circuitry, algorithms for estimating location based on proximate wireless networks, such as local Wi-Fi networks, and/or magnetometer circuitry for estimating a current facial direction of electronic device 10. I/O interface 24 may enable electronic device 10 to interface with various other electronic devices, as may network interfaces 26. Network interfaces 26 may include, for example, interfaces for a personal area network (PAN), such as a Bluetooth network, for a local area network (LAN), such as an 802.11x Wi-Fi network, and/or for a wide area network (WAN), such as a 3G cellular network.

To record video, electronic device 10 may first capture a series of video frames with image capture circuitry 28, which may take the form of a camera. The video frames may be encoded in specialized hardware in electronic device 10 or by CPU 12, using video coding algorithms and the techniques disclosed herein. Specifically, during the video encoding process, a quantization parameter (QP) may be selected based on image capture circuitry 28 motion. Image capture circuitry 28 motion may be determined not only by analyzing the motion of current video frames, but based on motion signals from accelerometers 30 and/or location-sensing circuitry 22.

FIG. 2 depicts handheld device 32, which represents one embodiment of electronic device 10. Handheld device 32 may represent, for example, a portable phone, a media player, a personal data organizer, a handheld game platform, or any combination of such devices. By way of example, handheld device 32 may be a model of an iPod® or iPhone® available from Apple Inc. of Cupertino, Calif.

Handheld device 32 may include enclosure 34 to protect interior components from physical damage and to shield them from electromagnetic interference. Enclosure 34 may surround display 18, on which user interface 20 may display icons such as indicator icons 36, which may indicate a cellular signal strength, Bluetooth connection, and/or battery life. I/O interfaces 24 may open through enclosure 34 and may include, for example, a proprietary I/O port from Apple Inc. to connect to external devices.

User input structures 38, 40, 42, and 44 may, in combination with display 18, allow a user to control handheld device 32. For example, input structure 38 may activate or deactivate handheld device 32, input structure 40 may navigate user interface 20 to a home screen or a user-configurable application screen, input structures 42 may provide volume control, and input structure 44 may toggle between vibrate and ring modes. Microphones 46 and speaker 48 may enable playback of audio and/or may enable certain phone capabilities. Headphone input 50 may provide a connection to external speakers and/or headphones.

Figure 3:
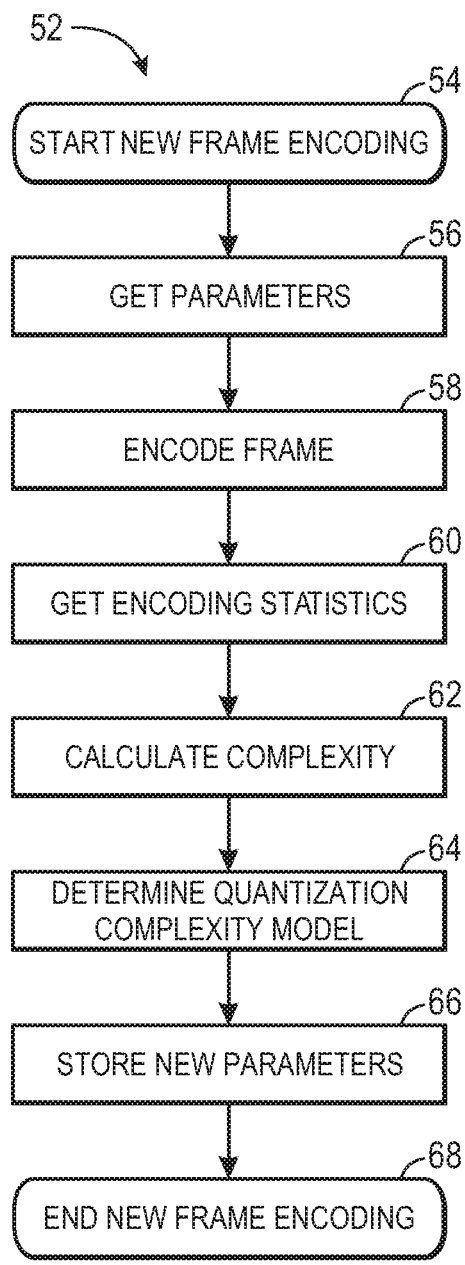
FIG. 3 is a flowchart of an embodiment of a method for video coding, in accordance with an embodiment.

Flowchart 52 of FIG. 3 describes an embodiment of a method for encoding a frame of video using electronic device 10. The method of flowchart 52 may be implemented in hardware or software of electronic device 10, and may specifically involve selecting a quantization parameter (QP) based at least in part on motion sensing information from accelerometers 30 or location-sensing circuitry 22. Flowchart 52 may begin with step 54, which follows after a prior frame has been encoded and after the current encoding parameters, including the quantization parameter QP, have been obtained based on the prior-encoded frame. In other words, each current frame may be encoded based on parameters determined during the encoding of the prior frame. In step 54, the encoding process may begin by obtaining an uncompressed current frame of video to be encoded.

The uncompressed current frame of video may be received from memory 14 or nonvolatile memory 16, and may derive from image capture circuitry 28 or another source. If the current frame of video derives from another source, motion sensing data may accompany the uncompressed current video frame for subsequent processing at a later time. If the current frame of video derives from image capture circuitry 28, motion sensing data from accelerometers 30 or location-sensing circuitry 22 may accompany the current frame for subsequent processing at a later time, or may be obtained at the time of subsequent processing, as described below.

In step 56, encoding parameters obtained from the encoding of the prior frame may be obtained. The parameters may include, for example, the quantization parameter (QP), as well as an indication of frame type, or, specifically, whether the new frame is to be encoded as a key frame or a non-key frame. The QP may be one of a finite number of step sizes for approximating a spatial transform. By way of example, the QP may be a value from 0 to 51. Each increase by 1 in QP may represent a 12% increase in quantization steps. Thus, when the QP increases by 6, the corresponding step size may double. Higher step sizes may result in more crude approximations of spatial information during encoding. As such, higher values of QP may best suit images with relatively lower complexity, which may include images having relatively little motion.

The frame type parameter may indicate whether or not the current frame should be encoded as a key frame or a non-key frame. A key frame may represent a frame of video that can be decoded without referring to any other frame and will function as a reference frame for subsequent non-key frames. Thus, less video frame information may be removed during the encoding process if the current video frame is to be encoded as a key frame. Similarly, if the current video frame is to be encoded as a non-key frame, more video frame information may be removed, since non-key frames may simply provide data indicating changes from their reference frame(s).

Based on the parameters obtained in step 56, the current frame may be encoded in step 58. The encoding process of step 58 may be carried out in software or hardware, and may rely on techniques described, for example, by the MPEG-1, 2, or 4 specifications and/or the H.261, H.263, or H.264 specifications. The encoded video signal for the current frame may take up a certain number of bits depending on the complexity of the frame and the quantization parameter (QP) provided in step 56. A higher frame complexity or lower QP may produce a video signal taking up more space, while a lower frame complexity or higher QP may produce a video signal taking up less space.

Additionally, the encoding process may involve determining a prediction error differing between the predicted encoded current frame and the actual, original uncompressed current frame. This prediction error may carry additional spatial details about the predicted frame. At a later time, during the decoding process prior to viewing the encoded video, a spatial transform may be applied to the prediction error, thereby obtaining coefficients carrying spatial detail not present in the predicted frame. The quantization parameter (QP) may relate to the step sizes of such a spatial transform.

In step 60, encoding statistics, including the prediction error and/or the number of bits used to encode the current frame, may be obtained. In step 62, the complexity of the recently-encoded current frame may be calculated. The calculated complexity may represent spatial and/or temporal complexity of the recently-encoded frame.

Step 64 may involve determining the quantization parameter (QP) and frame type to be employed for encoding a subsequent video frame, based on the complexity of the current video frame determined in step 62, current motion-sensing input from accelerometers 30 and/or location-sensing circuitry 22, and/or available storage or transmission bandwidth. As noted above, electronic device 10 may lack the memory and processing capabilities that may otherwise be required for determining a quantization complexity model based on future frames. Additionally, it may be undesirable to buffer a number of recently-recorded uncompressed frames prior to encoding a new frame, as doing so may create a latency between recording and encoding that may be noticeable if the video is to be played back immediately. Thus, in step 64, rather than look ahead to future frames to determine future complexity and/or motion, electronic device 10 may employ motion-sensing information to serve as a proxy for such complexity and/or motion.

As such, in step 64, image capture circuitry 28 motion data may be obtained or inferred from accelerometers 30 or location-sensing circuitry 22. When such motion-sensing input is obtained from accelerometers 30, the data may indicate when electronic device 10 is moved in certain directions. Motion in different directions, as detected by accelerometers 30, may be interpreted as introducing a varying amount of image capture circuitry 28 motion into future video frames. For example, accelerometer 30 data indicating that electronic device 10 has moved in a direction forward or backward with respect to the orientation of image capture circuitry 28 may be interpreted as producing little image capture circuitry 28 motion, while accelerometer 30 data indicating that electronic device 10 has moved in a direction perpendicular to the orientation of image capture circuitry 28 or around an axis of image capture circuitry 28 may be interpreted producing significant image capture circuitry 28 motion.

In a similar manner, data from location-sensing circuitry 22 may also indicate varying degrees of image capture circuitry 28 motion, and may be used alone or in combination with accelerometer 30 data. If location-sensing circuitry 22 includes magnetometer circuitry for determining the orientation of electronic device 10 with respect to Earth's magnetic field, readings from the magnetometer circuitry may indicate when electronic device 10 is being rotated. Since rotating electronic device 10 may cause significant motion relative to the orientation of image capture circuitry 28, magnetometer circuitry data obtained during such events may be used to approximate image capture circuitry 28 motion. Similarly, video may be recorded while electronic device 10 is being moved, which may occur while a user is walking while recording video or recording video from a moving vehicle. Thus, data from location-sensing circuitry 22 that indicates an amount of physical location change of electronic device 10 may thus also approximate image capture circuitry 28 motion under certain circumstances.

Though an approximation of image capture circuitry 28 motion via input from accelerometers 30 and/or location-sensing circuitry 22 may generally relate to the motion of recorded video frames, such motion-sensing input may not relate in all instances. As such, the quantization parameter (QP) calculated in step 64 may be chosen to reflect the motion-sensing input only if the predicted error matches the approximated amount of image capture circuitry 28 motion provided by accelerometers 30 and/or location-sensing circuitry 22. FIGS. 5-8, discussed below, may illustrate such relationships.

In step 66, the newly determined parameters for quantization parameter (QP) and frame type may be stored in the main memory 14 or nonvolatile storage 16, to be employed in encoding the next video frame. In step 68, with the current frame having been encoded, the process of flowchart 52 may return to step 54 to encode the next video frame.

Figure 4:
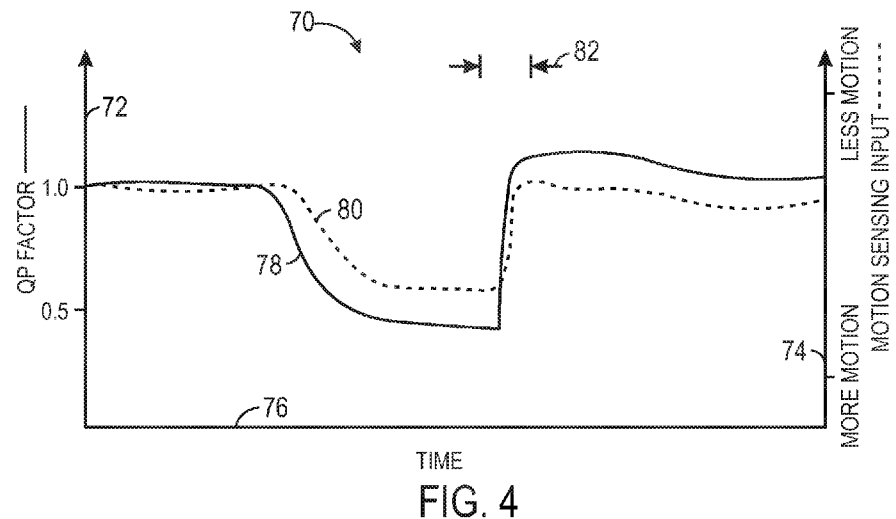
FIG. 4 is an exemplary plot relating quantization parameter (QP) and motion-sensing input over a period of time, in accordance with an embodiment.

FIG. 4 depicts exemplary plot 70, which relates the proper quantization parameter (QP) factor for a series of video frames of similar complexity and the corresponding image capture circuitry 28 motion as indicated by motion-sensing input from accelerometers 30 and/or location-sensing circuitry 22. First ordinate 72 of plot 70 represents a QP factor, normalized to a particular integer QP, from lower to higher. Second ordinate 74 represents a relative quantity of image capture circuitry 28 motion, as indicated by motion-sensing input from accelerometers 30 and/or location-sensing circuitry 22, from more image capture circuitry 28 motion to less image capture circuitry 28 motion. Abscissa 76 represents increasing time, and may be understood to represent a series of video frames obtained and processed by handheld device 32 in accordance with flowchart 52 of FIG. 3.

As generally indicated by plot 70, when the method of flowchart 52 is carried out, curve 78, which represents quantization parameter (QP) factor, may generally track curve 80, which represents motion-sensing input that approximates image capture circuitry 28 motion. Thus, when additional image capture circuitry 28 motion is detected by accelerometers 30 and/or location sensing-circuitry 22, QP may correspondingly decrease. This decrease in QP may cause such moving video frames, which may generally have a greater complexity, to be encoded with greater precision, which may properly capture such increased complexity. In certain situations, such as when an amount of image capture circuitry 28 motion changes dramatically, such movement may be largely ignored, as shown by time interval 82 of plot 70.

While plot 70 represents a general relationship between quantization parameter (QP) and motion-sensing input from accelerometers 30 and/or location-sensing circuitry 22, under certain circumstances, the motion-sensing input may not actually indicate motion in captured video frames. As such, it may be undesirable to relate QP to motion-sensing input under such circumstances. When the motion-sensing input does not indicate motion in corresponding video frames, changes in predicted error determined in the encoding step 58 over a series of encoded video frames may not track the motion-sensing input. FIGS. 5-8 illustrate variations in image capture circuitry 28 motion while recording video, as indicated by motion-sensing input from accelerometers 30 and/or location-sensing circuitry 22, the resulting recorded video frames, and corresponding prediction errors.

Figure 5:
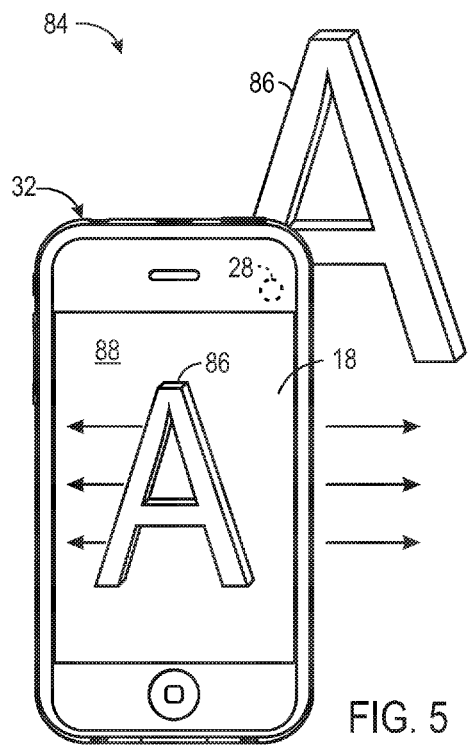
FIG. 5 is a schematic representation of a video recording operation, in accordance with an embodiment.

Turning first to FIG. 5, video recording operation 84 illustrates using image capture circuitry 28 of handheld device 32 to record video images of subject 86. Recorded video images of subject 86 may appear on display 18 as a series of video frames 88. As depicted in FIG. 5, in video recording operation 84, subject 86 is stationary. Thus, when a user moves handheld device 32 to the right, image capture circuitry 28 moves accordingly, and recorded video frames 88 show the movement of subject 86 to the left.

As video frames 88 are being obtained in video recording operation 84, accelerometers 30 may indicate that handheld device 32 has moved to the right. Additionally, if handheld device 32 has rotated with respect to Earth's magnetic field, and/or if handheld device 32 moves a detectable distance, the magnetometer circuitry or the GPS circuitry of location-sensing circuitry 22 may indicate as such. The degree of motion indicated by accelerometers 30 and/or location-sensing circuitry 22 may be considered when quantization parameter (QP) is determined in step 64 of flowchart 52 of FIG. 3. As should be appreciated, in video recording operation 84 of FIG. 5, the amount of image capture circuitry 28 motion indicated by accelerometers 30 and/or location-sensing circuitry 22 may correspond to the amount of motion in recorded video frames 88.

Figure 6:
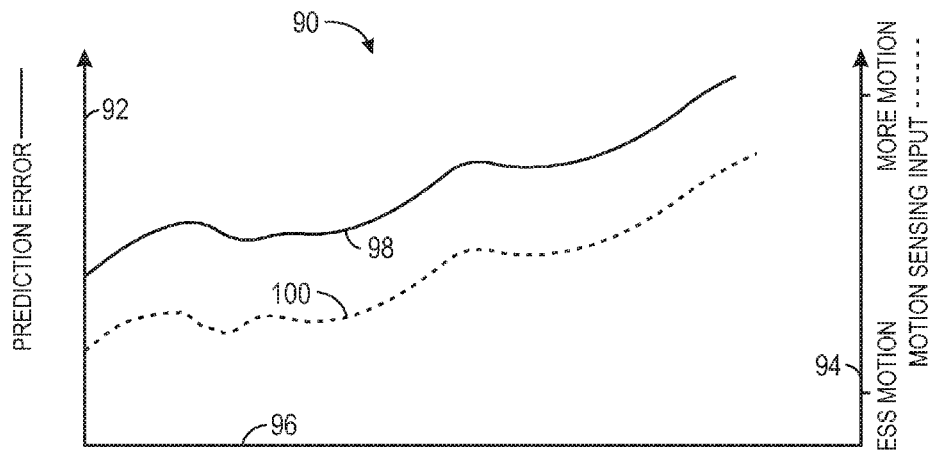
FIG. 6 is an exemplary plot relating prediction error and a motion-sensing input signal over a period of time when the video recording operation of FIG. 5 is employed, in accordance with an embodiment.

Plot 90 of FIG. 6 compares prediction error and motion-sensing input for recorded video frames 88 over time, when the motion of image capture circuitry 28 corresponds to motion of the recorded video frames 88, as generally may be obtained during video recording operation 84. First ordinate 92 of plot 90 represents prediction error, which represents a difference between a predicted frame and an original uncompressed frame, as may be determined during the frame encoding of step 58 of flowchart 52 of FIG. 3. Since prediction error relates a predicted frame and an original frame, if the original frame includes a greater amount of motion than otherwise predicted, prediction error may increase. Second ordinate 94 of plot 90 represents a quantity of approximated image capture circuitry 28 motion sensed based on motion-sensing input from accelerometers 30 and/or location-sensing circuitry 22. Abscissa 96 represents time as video frames 88 are recorded. As shown in plot 90, prediction error curve 98 gradually increases in a manner that corresponds to motion-sensing input curve 100. Since prediction error curve 98 largely tracks motion-sensing input curve 100 for recent prior frames, motion-sensing input indicating current image capture circuitry 28 motion may accordingly signify that motion is likely to occur in future frames as well.

Historical information, such as the information illustrated plot 90 relating prediction error and approximated image capture circuitry 28 motion, may be stored in memory during the frame encoding process of flowchart 52 of FIG. 3. Referring to step 64 of flowchart 52 of FIG. 3, when the quantization parameter (QP) for the subsequent frame is determined, such historical information may be considered. If the predicted error for a certain number of recent prior frames tracks the amount of image capture circuitry 28 motion indicated by motion-sensing input from accelerometers 30 and/or location-sensing circuitry 22, the current amount of image capture circuitry 28 motion indicated by the motion-sensing input may be considered in determining QP.

In some embodiments, the degree to which the predicted error for a certain number of recent prior frames tracks the amount of image capture circuitry 28 motion, as indicated by motion-sensing input from accelerometers 30 and/or location-sensing circuitry 22, may be considered during step 64 of flowchart 52 of FIG. 3. For example, a rate of increase in predicted error for a certain number of recent prior encoded frames may be related to a rate of increase in image capture circuitry 28 motion. This relationship may be used to estimate a degree of future video frame motion based on the degree of current image capture circuitry 28 motion, which may also be used for determining the appropriate quantization parameter (QP) for the frame.

Figure 7:
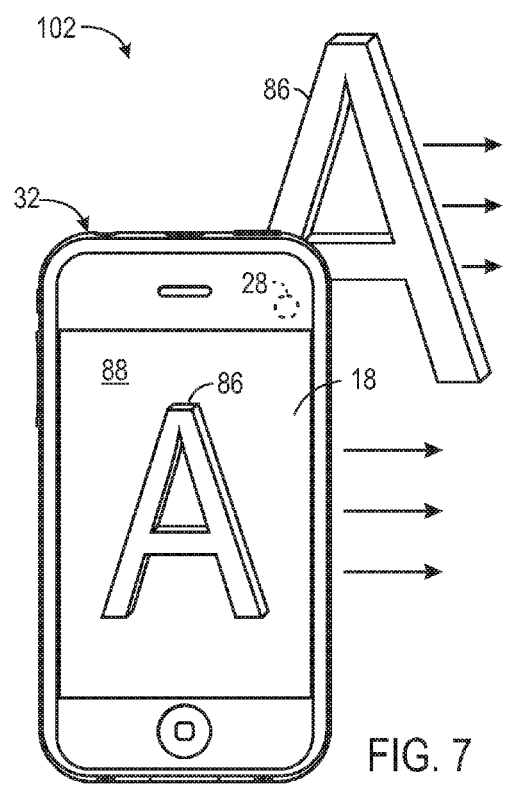
FIG. 7 is a schematic diagram of another video recording operation, in accordance with an embodiment.
Figure 8:
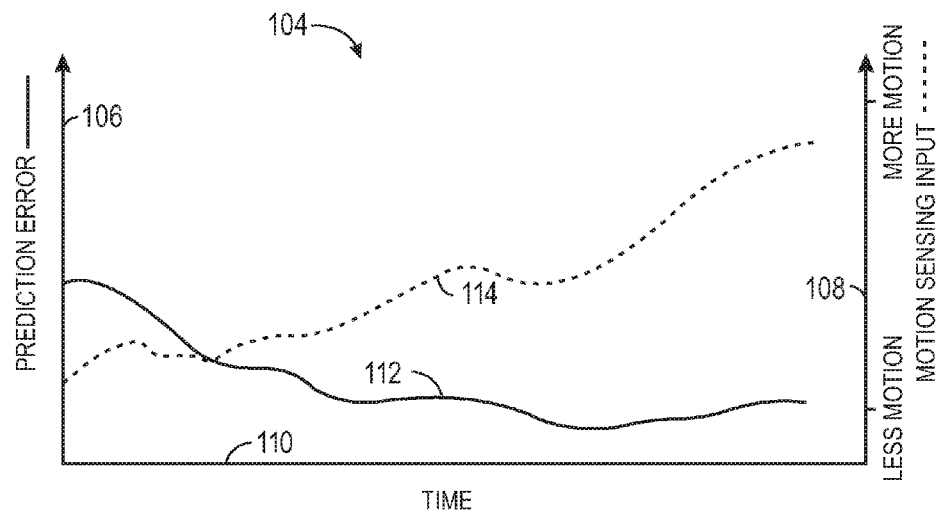
FIG. 8 is an exemplary plot relating prediction error and a motion-sensing input signal over a period of time when the video recording operation of FIG. 7 is employed, in accordance with an embodiment.

Under certain other video recording circumstances, the prediction error may not match the motion-sensing input because image capture circuitry 28 motion may not be accompanied by video frame motion. FIGS. 7 and 8 generally describe one such situation. Turning first to FIG. 7, video recording operation 102 illustrates using image capture circuitry 28 of handheld device 32 to record video images of subject 86. Recorded video images of subject 86 may appear on display 18 as video frames 88. As depicted in FIG. 7, in video recording operation 102, subject 86 is moving to the right. Thus, when a user moves handheld device 32 to the right, image capture circuitry 28 moves accordingly, and subject 86 may remain largely stationary during recorded video frames 88.

Plot 104 of FIG. 8 compares prediction error and motion-sensing input for recorded video frames 88 over time, when the motion of image capture circuitry 28 does not correspond to motion in the recorded video frames 88. Accordingly, plot 104 of FIG. 8 may generally represent data obtained during video recording operation 102. First ordinate 106 of plot 104 represents prediction error, which represents a difference between a predicted frame and an original uncompressed frame, as may be determined during the frame encoding of step 58 of flowchart 52 of FIG. 3. Since prediction error relates a predicted frame and an original frame, if the original frame includes a greater amount of motion than otherwise predicted, prediction error may increase with increased image capture circuitry 28 motion, and vice versa. Second ordinate 108 of plot 104 represents a quantity of approximated image capture circuitry 28 motion sensed based on motion-sensing input from accelerometers 30 and/or location-sensing circuitry 22. Abscissa 110 represents time as video frames 88 are recorded. As shown in plot 102, prediction error curve 112 gradually decreases, while motion-sensing input curve 114 increases, indicating that the two data are currently unrelated. Since prediction error curve 110 does not track motion-sensing input curve 114 for recent prior frames, motion-sensing input indicating an amount of current image capture circuitry 28 motion may be largely irrelevant regarding motion of video frames in the near future.

When the historical information comparing prediction error and approximated image capture circuitry 28 motion, which may be stored in memory during the frame encoding process of flowchart 52 of FIG. 3, does not indicate a relationship, motion sensing input from accelerometers 30 and/or location-sensing circuitry 22 may not be accorded much weight. In particular, during step 64 of flowchart 52 of FIG. 3, when the quantization parameter (QP) for the subsequent frame may be determined, motion-sensing input may be disregarded or considered only to the degree that recent historical data indicate a relationship between prediction error and image capture circuitry 28.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
a camera to capture an uncompressed video frame;
motion-sensing circuitry to detect physical motion of the electronic device; and
data processing circuitry to encode the uncompressed video frame based at least in part on a quantization parameter, to compare a prediction error of a preceding encoded frame, representing a difference between the encoded frame and a source frame from which the encoded frame was coded, to the detected physical motion for the preceding encoded frame, and to select the quantization parameter based at least in part on the detected physical motion by the motion-sensing circuitry and the prediction error.

2. The electronic device of claim 1, wherein the motion-sensing circuitry comprises one or more accelerometers; magnetometer circuitry; or Global Positioning System circuitry; or any combination thereof.

3. The electronic device of claim 1, wherein the motion-sensing circuitry detects a quantity of physical motion of the electronic device.

4. The electronic device of claim 1, wherein the data processing circuitry selects the quantization parameter based at least in part on a quantity of physical motion of the electronic device detected by the motion-sensing circuitry.

5. The electronic device of claim 1, wherein the comparison of the predicted error to the detected physical motion is used to determine the degree to which the detected physical motion is used to select the quantization parameter.

6. The electronic device of claim 5, wherein the data processing circuitry decreases the degree to which the detected physical motion is used to select the quantization parameter when the predicted error does not correlate with the physical motion of the electronic device detected by the motion-sensing circuitry.

7. A method comprising:
receiving, into data processing circuitry, a current uncompressed video frame from a camera and a previously-selected quantization parameter;
encoding, using the data processing circuitry, the current uncompressed video frame based at least in part on the previously-selected quantization parameter to obtain a current encoded video frame; and
selecting, using the data processing circuitry, a subsequent quantization parameter, based on a prediction error of a preceding frame, representing a difference between the encoded frame and a source frame from which the encoded frame was coded, for encoding a future uncompressed video frame from the camera based at least in part on a complexity of the current encoded video frame and a detected physical movement of the camera by motion-sensing circuitry for the current uncompressed video frame.

8. The method of claim 7, wherein the subsequent quantization parameter is selected based at least in part on the detected physical movement of the camera, wherein the detected physical movement of the camera includes a side-to-side motion with respect to the camera, a rotation with respect to the camera, or any combination thereof.

9. The method of claim 7, wherein the subsequent quantization parameter is selected based at least in part on a quantity of the deleted physical movement of the camera.

10. The method of claim 7, wherein the subsequent quantization parameter is selected to be lower than otherwise when a physical movement of the camera is detected.

11. The method of claim 7, wherein the subsequent quantization parameter is selected to be higher than otherwise when a physical movement of the camera is detected.

12. The method of claim 7, wherein the subsequent quantization parameter is selected based at least in part on a direction of the detected physical movement of the camera.

13. The method of claim 7, wherein the subsequent quantization parameter is selected to be lower when a direction of the detected physical movement of the camera is perpendicular to a facial direction of the camera than when the direction of the detected physical movement of the camera is parallel to the facial direction of the camera.

14. An electronic device comprising:
a camera to capture an uncompressed video frame;
motion-sensing circuitry to detect physical motion of the camera; and
data processing circuitry to encode the uncompressed video frame in accordance with a quantization metric and to select the quantization metric, based on a prediction error of a preceding frame, representing a difference between the encoded frame and a source frame from which the encoded frame was coded, and a quantity of physical motion of the camera detected by the motion-sensing circuitry and based on a relationship between historical statistics regarding prior-encoded video frames indicating the quantity of physical motion of the camera detected by the motion-sensing circuitry when the prior-encoded video frames were captured and a quantity of motion in prior uncompressed video frames.

15. The electronic device of claim 14, wherein the data processing circuitry encodes the uncompressed video frame using an encoding technique in compliance with the MPEG-1 standard; the MPEG-2 standard; the MPEG-4 standard; the H.261 standard; the H.263 standard; or the H.264 standard; or any combination thereof.

16. The electronic device of claim 14, wherein the data processing circuitry selects the quantization metric by selecting from one of a plurality of quantization parameters.

17. The electronic device of claim 14, comprising a memory device to store the historical statistics regarding the prior-encoded video frames indicating the quantity of physical motion of the camera detected by the motion-sensing circuitry when the prior-encoded video frames were captured and the quantity of motion in the prior uncompressed video frames.

18. The electronic device of claim 14, wherein the data processing circuitry determines a relationship between historical statistics regarding the prior-encoded video frames indicating the quantity of physical motion of the camera detected by the motion-sensing circuitry when the prior-encoded video frames were captured and the quantity of motion in the prior uncompressed video frames.

19. The electronic device of claim 14, wherein the data processing circuitry selects the quantization metric by selecting a fewer number of quantization steps than otherwise when the motion-sensing circuitry indicates a quantity of motion of the camera and a relationship exists between the historical statistics regarding the prior-encoded video frames indicating the quantity of physical motion of the camera detected by the motion-sensing circuitry when the prior-encoded video frames were captured and the quantity of motion in the prior uncompressed video frames.

20. A method comprising:
receiving an uncompressed video frame from a camera into data processing circuitry;
receiving a motion-sensing input from motion-sensing circuitry indicating physical movement or non-movement of the camera into the data processing circuitry; and
encoding the uncompressed video frame in the data processing circuitry using a quantization parameter, based on a prediction error of a preceding frame, representing a difference between the encoded frame and a source frame from which the encoded frame was coded, and the motion-sensing input indicating physical movement of a compressed frame preceding the uncompressed video frame and a complexity of the compressed video frame preceding the uncompressed video frame.

21. The method of claim 20, wherein the uncompressed video frame is encoded using finer-grained encoding when the motion-sensing input indicates physical movement of the camera than when the motion-sensing input indicates physical non-movement of the camera.

22. The method of claim 20, comprising determining whether the physical movement or non-movement of the camera correlates with or is likely to correlate with motion of the uncompressed video frame, wherein the uncompressed video frame is encoded based at least in part on the determination of whether the physical movement or non-movement of the camera correlates with or is likely to correlate with motion of the uncompressed video frame.

23. The method of claim 22, wherein the uncompressed video frame is encoded using finer-grained encoding than otherwise when the physical movement of non-movement of the camera is determined to correlate with or be likely to correlate with motion of the uncompressed video frame and when the motion-sensing input indicates physical movement of the camera.

24. The method of claim 20, wherein the uncompressed video frame is encoded based at least in part on a quantity of physical movement of the camera indicated by the motion-sensing input.

25. The method of claim 24, wherein the uncompressed video frame is encoded using finer-grained encoding when the quantity of physical movement of the camera is higher than when the quantity of physical movement of the camera is lower.

26. A system comprising:
a camera to obtain an uncompressed frame of video data;
motion-sensing circuitry to detect physical movements of the camera; and
data processing circuitry to predict a complexity of the uncompressed frame of video data using a quantization parameter, based on a prediction error of a preceding frame, representing a difference between the encoded frame and a source frame from which the encoded frame was coded, and physical movements of the camera detected by the motion-sensing circuitry and a complexity of a prior-encoded frame of video data and to encode the uncompressed frame of video data based at least in part on the predicted complexity of the uncompressed frame of video data based at least in part on the physical movements of the camera.

27. The system of claim 26, wherein the data processing circuitry is configured to predict, all other things being equal, a higher complexity when the motion-sensing circuitry detects physical movements of the camera than when the motion-sensing circuitry does not detect physical movements of the camera.

28. The system of claim 26, wherein the data processing circuitry encodes the uncompressed frame of video data using fewer quantization steps when the predicted complexity is higher and using more quantization steps when the predicted complexity is lower.

29. The system of claim 26, wherein a first electronic device comprises the camera and the motion sensing circuitry and wherein a second electronic device comprises the data processing circuitry.

30. The electronic device of claim 1, wherein the camera and the motion-sensing circuitry are disposed within the same housing.

31. The electronic device of claim 1, wherein the data processing circuitry selects the quantization parameter based on the degree of motion of the electronic device detected by the motion-sensing circuitry, and the physical motion is detected while the uncompressed video frame is captured by the camera.

32. The method of claim 7, wherein the camera and the motion-sensing circuitry are disposed within the same housing.

33. The electronic device of claim 14, wherein the camera and the motion-sensing circuitry are disposed within the same housing.

34. The electronic device of claim 14, wherein the physical motion of the camera is detected while the uncompressed video frame is captured by the camera.

35. The method of claim 20, wherein the camera and the motion-sensing circuitry are disposed within the same housing.

36. The method of claim 20, wherein the motion-sensing input from the motion-sensing circuitry indicates a degree of physical movement of the camera, and the physical movement of the camera is detected while the uncompressed video frame is captured by the camera.

37. The system of claim 26, wherein the camera and the motion-sensing circuitry are disposed within the same housing.

\* \* \* \* \*